United States Patent
Tenev et al.

(10) Patent No.: US 9,792,203 B2
(45) Date of Patent: Oct. 17, 2017

(54) ISOLATED TESTING OF DISTRIBUTED DEVELOPMENT PROJECTS

(71) Applicants: Dimitar Tenev, Sofia (BG); Petar Skelin, Sofia (BG); Inbal Zilberman, Ra'anana (BG)

(72) Inventors: Dimitar Tenev, Sofia (BG); Petar Skelin, Sofia (BG); Inbal Zilberman, Ra'anana (BG)

(73) Assignee: SAP SE, Walldorf (DE)

( * ) Notice: Subject to any disclaimer, the term of this patent is extended or adjusted under 35 U.S.C. 154(b) by 202 days.

(21) Appl. No.: 14/144,558

(22) Filed: Dec. 31, 2013

(65) Prior Publication Data

US 2015/0135158 A1 May 14, 2015

Related U.S. Application Data

(60) Provisional application No. 61/904,448, filed on Nov. 14, 2013.

(51) Int. Cl.
G06F 9/44 (2006.01)
G06F 11/36 (2006.01)

(52) U.S. Cl.
CPC ...... *G06F 11/3684* (2013.01); *G06F 11/3668* (2013.01); *G06F 11/3696* (2013.01)

(58) Field of Classification Search
CPC .... G06F 11/3664; G06F 8/34; G06F 11/3668; G06F 11/3696
See application file for complete search history.

(56) References Cited

U.S. PATENT DOCUMENTS

| | | |
|---|---|---|
| 6,002,869 A | 12/1999 | Hinckley |
| 7,496,791 B2 | 2/2009 | Tillmann et al. |
| 7,587,636 B2 | 9/2009 | Tillmann et al. |
| 7,721,265 B1 * | 5/2010 | Xu et al. .......... 717/127 |
| 7,958,230 B2 | 6/2011 | Guruswamy et al. |
| 8,510,717 B2 | 8/2013 | Georgieva et al. |
| 8,527,954 B2 | 9/2013 | Benameur et al. |
| 8,589,883 B2 | 11/2013 | Demant et al. |
| 8,601,441 B2 | 12/2013 | Kaulgud et al. |
| 8,645,326 B2 | 2/2014 | Weizman et al. |

(Continued)

OTHER PUBLICATIONS

Herbsleb, J.D., et al., "An Empirical Study of Speed and Communication in Globally Distributed Software Development" [Online], IEEE Jun. 2003, pp. 481-494, [Retrieved from Internet on Jul. 22, 2016], <http://ieeexplore.ieee.org/stamp/stamp.jsp?tp=&arnumber=1205177>.*

(Continued)

*Primary Examiner* — Ziaul A Chowdhury

(57) ABSTRACT

Computer systems and methods for isolated testing of distributed development projects to enable test-driven development are described. In one aspect, a build of the distributed project is generated based on locally available resources. A number of unit tests are identified related to program code developed locally as part of the distributed project. In another aspect, the unit tests are parsed to identify dependencies for executing the unit tests and the related program code. A mock interface is instantiated to handle the dependencies related to resources that are not available locally. In yet another aspect, the unit tests are executed by a local script engine, and a result is generated by a script testing framework.

15 Claims, 6 Drawing Sheets

(56) References Cited

U.S. PATENT DOCUMENTS

| | | | |
|---|---|---|---|
| 8,667,467 B2 | 3/2014 | Dubey et al. | |
| 8,694,966 B2 | 4/2014 | Gupta | |
| 8,706,801 B2* | 4/2014 | Cahill | G06F 17/3089 |
| | | | 709/203 |
| 8,707,265 B2 | 4/2014 | Li | |
| 8,892,947 B1* | 11/2014 | Chopra et al. | 714/32 |
| 9,009,666 B1* | 4/2015 | Martindale et al. | 717/122 |
| 2004/0143819 A1 | 7/2004 | Cheng et al. | |
| 2004/0268345 A1* | 12/2004 | Lodwick et al. | 717/176 |
| 2005/0021274 A1* | 1/2005 | Eden et al. | 702/121 |
| 2005/0223360 A1* | 10/2005 | Seeman | G06F 11/3696 |
| | | | 717/124 |
| 2005/0229161 A1* | 10/2005 | Wang et al. | 717/125 |
| 2006/0132480 A1* | 6/2006 | Muller | G06F 11/3668 |
| | | | 345/418 |
| 2006/0248504 A1* | 11/2006 | Hughes | G06F 11/3664 |
| | | | 717/101 |
| 2007/0180429 A1* | 8/2007 | Gogh et al. | 717/126 |
| 2008/0092120 A1* | 4/2008 | Udupa | G06F 11/3696 |
| | | | 717/124 |
| 2008/0127034 A1* | 5/2008 | Pasricha et al. | 717/100 |
| 2008/0301649 A1* | 12/2008 | Stall | G06F 11/3664 |
| | | | 717/134 |
| 2009/0007073 A1* | 1/2009 | Huang et al. | 717/124 |
| 2009/0007074 A1* | 1/2009 | Campion et al. | 717/124 |
| 2009/0299680 A1* | 12/2009 | Gibbs | G06F 11/3664 |
| | | | 702/119 |
| 2012/0047489 A1 | 2/2012 | Varadharajan | |
| 2012/0084754 A1 | 4/2012 | Ziegler et al. | |
| 2012/0131556 A1* | 5/2012 | Mathur | G06F 11/3664 |
| | | | 717/125 |
| 2012/0151455 A1* | 6/2012 | Tsantilis et al. | 717/132 |
| 2013/0031499 A1* | 1/2013 | Vishnubhatta et al. | 715/765 |
| 2013/0104106 A1* | 4/2013 | Brown | G06F 11/3696 |
| | | | 717/124 |
| 2013/0152047 A1* | 6/2013 | Moorthi et al. | 717/124 |
| 2013/0297973 A1 | 11/2013 | Hyland et al. | |
| 2013/0339930 A1 | 12/2013 | Xu | |
| 2014/0007121 A1* | 1/2014 | Caufield et al. | 718/103 |
| 2014/0026119 A1* | 1/2014 | DeJana et al. | 717/124 |
| 2014/0223418 A1* | 8/2014 | Michelsen | G06F 11/3696 |
| | | | 717/135 |
| 2014/0359565 A1* | 12/2014 | Frankel et al. | 717/106 |
| 2015/0331784 A1* | 11/2015 | Nanjundappa | G06F 11/3688 |
| | | | 717/124 |
| 2016/0026558 A1* | 1/2016 | Krishnan | G06F 11/3668 |
| | | | 717/124 |

OTHER PUBLICATIONS

Jeff Sutherland et al., "Distributed Scrum: Agile Project Management with Outsourced Development Teams",[Online], 2007, pp. 1-10, [Retrieved from Internet on Jul. 22, 2016], <https://34slpa7u66f159hfp1fhl9aur1-wpengine.netdna-ssl.com/wp-content/uploads/2014/05/Distrubted-Scrum.pdf>.*

David Stotts et al., "Virtual Teaming: Experiments and Experiences with Distributed Pair Programming", [Online], 2003, pp. 129-141, [Retrieved from Internet on Jul. 22, 2016], <http://download.springer.com/static/pdf/752/chp%253A10.1007%252F978-3-540-45122-8_15.pdf>.*

Anthony Allowatt et al. "IDE Support for Test-driven Development and Automated Grading in Both Java and C++", [Online], 2005, pp. 100-104, [Retrieved from Internet on Jul. 22, 2016], <http://delivery.acm.org/10.1145/1120000/1117717/p100-allowattpdf>.*

David L. Martin et al., "The open agent architecture: A Framework for Building Distributed Software Systems", [Online], 1999, pp. 1-38, [Retrieved from Interent on Jun. 22, 2017], <http://dbmoran.users.sonic.net/dougmoran-com/dmoran/Papers/oaa-aai1999.pdf>.*

Alberto J. Espinosa et al., "Team Knowledge and Coordination in Geographically Distributed Software Development", [Online], 2007, pp. 135-169, [Retrieved from Internet on Jun. 22, 2017], <https://www.researchgate.net/profile/J_Espinosa/publication/220041546>.*

Yoshikazu Takahashi et al., "Software framework for distributed experimental-computational simulation of structural systems", [Online], 2005, pp. 1-25, [Retrieved from Internet on Jun. 22, 2017], <http://wwwcatfish.dpri.kyoto-u.ac.jp/~yos/thesis/Takahashi-t06.pdf>.*

Filippo Lanubile et al. "Collaboration Tools for Global Software Engineering", [Online], 2010, pp. 52-55, [Retrieved from Interent on Jun. 22, 2017], <https://vector.com/portal/medien/vector_consulting/publications/Ebert_CollaborationTools_IEEESoftware_2010V27N2.pdf>.*

* cited by examiner

ISOLATED TESTING OF DISTRIBUTED DEVELOPMENT PROJECTS

This application claims priority to U.S. Provisional Patent Application Ser. No. 61/904,448, titled LOCAL TEST DRIVEN DEVELOPMENT FRAMEWORK FOR DISTRIBUTED DEVELOPMENT PROJECTS, filed Nov. 14, 2013, which is hereby incorporated by reference.

BACKGROUND

Test-driven development is an approach for creating software, characterized by short development cycles, where the development of a new software feature is preceded by writing at least one test for that feature. Essentially, the developers following the test-driven development approach focus on the requirements of the new feature for software program, e.g., script or scripts, service, product, etc.) before any actual programming. Once a test for the behavior of the new feature is created, a developer may program the feature to satisfy the test. The test-driven development also requires executing other similar tests for previously developed features, if any. Thus, it may be checked whether the new code alters the functionality of the previous development.

Typically, the development of commercially oriented computer programs is organized as distributed projects involving a number of developers. Following test-driven development approach in distributed development projects is challenging, at least because different features of a computer program are developed in parallel by different programmers. An additional challenge before the test-driven development approach is associated with accessing shared resources when the developed software programs should operate in client-server environment (e.g., providing services over the Internet to multiple clients).

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for isolated testing of distributed development projects are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
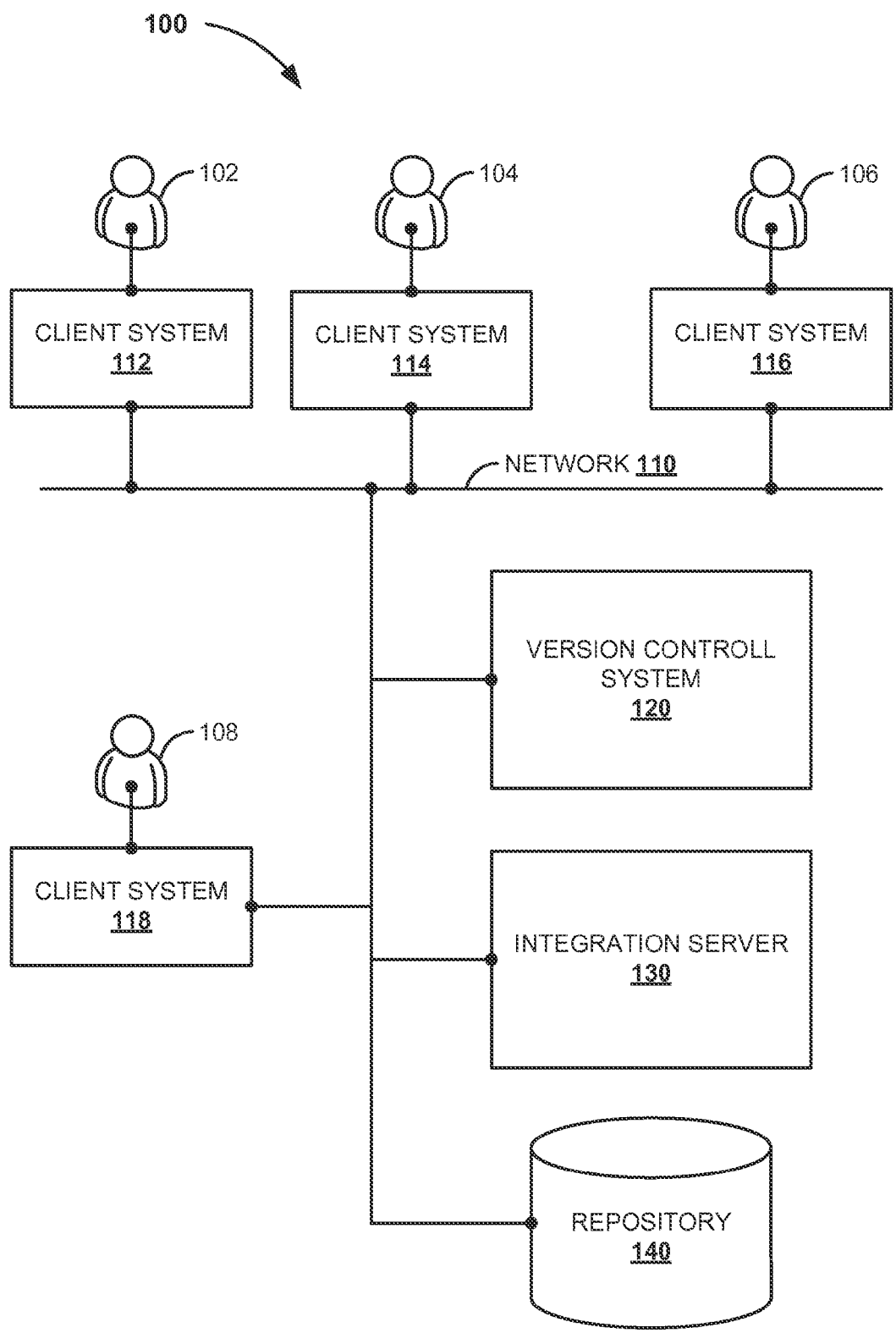
FIG. 1 is a block diagram illustrating a distributed development environment, according to one embodiment.

FIG. 1 shows an exemplary, and rather simplified, distributed development environment 100. A distributed development project may involve a number of developers 106-108 operating on client systems 112-118. In one embodiment, the developers 106-108 apply test-driven development (TDD) to ensure high semantic coverage by generating new software programs by incremental small development steps. The generation of new software code may be combined with creation of extensive unit tests for the various incremental development steps, e.g., by applying Agile Software Engineering methods. The Agile Software Engineering or development encompasses a group of methods for iterative and incremental development, e.g., of new software features and the necessary tests for testing the software features to be created. The Agile Software Engineering methods enable development of different solutions through collaboration.

The exemplary development environment 100 illustrated in FIG. 1 show the main elements involved in comprehensive continuous integration (CI) processes, e.g., for distributed development projects. To ensure successful collaboration, the unit tests should cover the majority of the functionality and/or behavior of the code to be developed. For example, at least 90% of the programming may be determined by unit tests. In addition to the unit tests, a higher level integration tests may be developed that focus on integration between the different (e.g., incremental) functionalities without repeating the unit tests.

In one embodiment, one or more of the developers 102-108 working on a common distributed project may sync their local source repository, e.g., on respective system or systems 112-118, with the latest project changes. The users 102-108 may generate local builds of the developed project, for executing prepared unit tests prepared for checking the behavior of their local incremental developments. The locally generated code that is tested successfully could be committed to version control system 120, e.g., stored in a repository of the version control system 120. Integration server 130 may retrieve a latest copy of the code committed or collected at the version control system 120. In one embodiment, the integration server 130 may sync and compile and deploy the retrieved latest software code. Further, a number of unit tests and/or integration tests may be run on the deployed latest version of the software project code. A number of tests may be run by one or more of the developers 102-108, e.g., via client systems 112-118. The unit tests and/or the integration tests may be run based on various testing scenarios, including based on established dependencies between the tests, such as, order of execution, selecting of test to be run based on a result of a previously executed test, etc.

The results of the tests run at the integration server 130 could be stored at repository 140. In one embodiment, the code submitted through client systems 112-118 to the version control system 120 is stored at repository 140, too. The local syncs at one or more of the systems 112-118 could be based on the code stored at the repository 140. In one embodiment, the different communication between the different systems (e.g., client systems 112-118, version control system 120, integration server 130 and repository 140) could be handled by network 110. Network 110 could be a public network, such as the Internet, or a private network, e.g., intranet of an organization.

Figure 2:
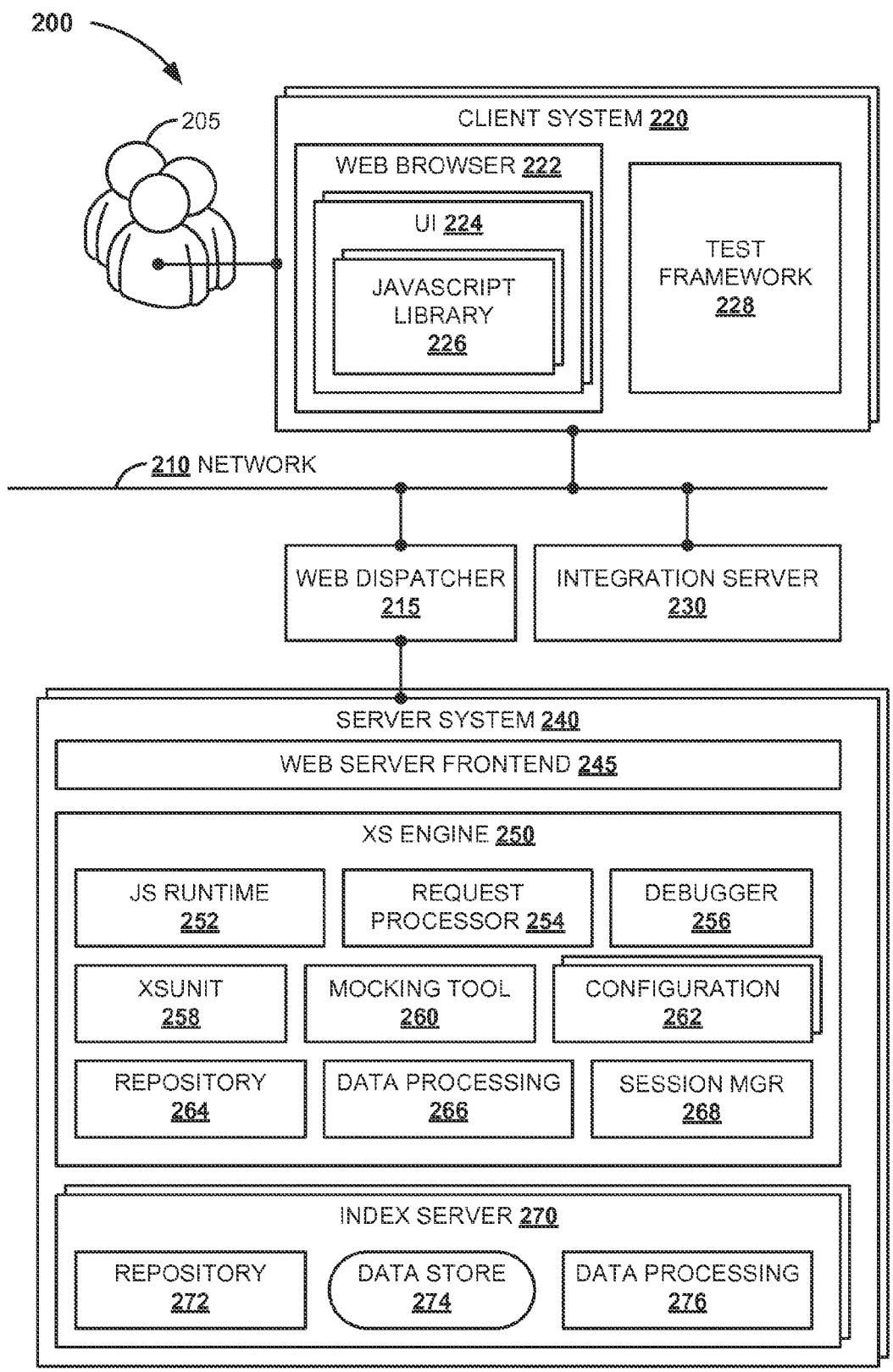
FIG. 2 is a block diagram illustrating a computer system for implementing distributed development projects, according to one embodiment.

There are different types of distributed development projects, aimed at producing different kind of software. The implementation of TDD is especially useful in developing software services. Thus, the small incremental development steps, and respectively, the corresponding unit tests may correspond to separate services. For example, such services may be supported or provided by script engines running on servers and executing scripts corresponding to the services. Thus, different developers may work on different scripts to be executed by such script engines, separately or in combination, to provide particular software services to clients. FIG. 2 shows exemplary distributed computing environment 200 that enables development and execution of scripts to provide various software services.

For illustrative purposes, the computing environment 200 shown in FIG. 2 is based on SAP HANA® server developed by SAP AG Company. The abbreviation HANA stands for "High Performance Analytics Appliance" and is usually used to address in-memory database management system developed and provided by SAP AG. However, SAP HANA includes various capabilities in addition to the database management to provide a comprehensive solution for in-memory data processing and analytics. For example, SAP HANA includes infrastructure for providing services directly on a HANA server, e.g., through executing various scripts by an integrated script engine. Such scripts could be preprogrammed, but also could be developed by customers or third parties to enhance the functionality of SAP HANA.

As illustrated, SAP HANA may be implemented on one or more server systems 240 and consist of multiple servers. Typically, SAP HANA may consist of Index Server 270, Name Server (not illustrated), Statistics Server (not illustrated), Preprocessor Server (not illustrated) and SAP HANA Application Services (XS) Engine 250. The index server 270 contains the actual data and the engines for processing the data. It may also coordinate and use the other servers. Accordingly, index server 270 may include data store 274 for the actual data, data processing module 276 for the engines, and repository 272 to keep application content.

The XS engine 250 may be an optional component of SAP HANA. Using XS engine 250, clients can connect to SAP HANA to manipulate and/or fetch data, e.g., via hypertext transfer protocol (HTTP). The XS engine 250 can be defined as a special SAP HANA index server that may not use its own data store, but enables application development and mapping to an adopted consumption model by additional application services. SAP HANA Application Services, provided by XS engine 250, may include various components. For example, various HTTP based consumption requests may be handled by request handler that, depending on the type of request, directly provides the response or delegates the call to a corresponding resource handler. Application containers may be used to process application specific content (e.g. stored in repository 264) like logic implemented in server side JavaScript®.

SAP HANA Application Services may also offer a web-server frontend 245, such as Internet Communication Manager (ICM) and two kinds of application containers. The first kind of the containers is built upon "C++" programming language technology and is used for fixed set of system tasks, e.g., replication, repository browser, etc. The second kind of the containers is based on JavaScript and enables execution of JavaScript code server side. Thus, various services, e.g., based on Open Data Protocol (OData®) and/or Representational State Transfer (REST®) protocols, which are consumed by client systems (e.g. desktop or mobile) or even enterprise systems. SAP HANA Application Services is originally called XS as an acronym for Extended Scripting. HANA XS executes software programs in the form of XSJS code (HANA XS JavaScript). The XS engine 250 may have its own repository 264 to store relevant application content, including application content that is currently developed or tested, and data processing module 266. Session manager (MGR) 268 may control connections to the database layer of SAP HANA.

A client may access various applications and services enabled through HANA Application Services, e.g., through XS engine 250. For example, one or more users 205 of one or more client systems 220 may access SAP HANA implemented on server system/s 240 via network 210. The client systems may provide HTTP based user interface (UI) 224, e.g., within Web browser 222, to request various services directly at SAP HANA, without an additional external application server. Web dispatcher 215 may route the received service requests to different server systems 240 based on type of the request and/or current load. The requests received from the client systems 220 at corresponding server system 240 are handled by request processor 254 in communication with JS runtime 252, where the requested JavaScript programs are executed.

In one embodiment, the UI 224 includes JavaScript libraries 226 to allow easier development of JavaScript based programs, e.g., to be executed by SAP HANA XS engine 250. For example, the JavaScript based programs could be developed as distributed development projects following the test-driven development approach. The rendering of UI 224 may be implemented completely in the client system or systems 220. The server system or systems 240 may support data exposure (e.g., via OData) and static UI content provisioning. Different browser based applications may use HTML5 protocol for data exchange, such as, for example, SAP UI5. Further, the newly developed functionality could be tested directly on SAP HANA server system 240 using various test automation tools embedded in the XS engine 250. For example, XSUnit 258 may be a unit test framework to test JavaScript code and/or database content. In one embodiment, a unit test framework could be based on one or more existing, e.g., standardized, test frameworks that could be additionally extended for the purposes of SAP HANA based development and data content management.

Similarly, mocking tool 260 may represent a mocking framework that allows testing of various functionalities in isolation, e.g., without accessing real data. For example, various views, stored procedures and dependencies may be tested with the help of mocking tool 260. Debugger 256 and configuration 262 modules may further help development process by providing tools for configuring and tracking the execution of the created software, e.g., when the tests show deviation from the desired behavior.

A distributed development project could be developed applying Agile Software Engineering methods in the described SAP HANA environment. The incremental portions of new source code may be tested directly at the XS engine 250. In one embodiment the integration of the code developed by different developers working on the project could be facilitated by integration server 230. However, using the server systems 240 for the rigorous testing required by the test-driven development approach is still cumbersome and complex. Therefore, in one embodiment, the different users or developers 205 may test the result of their work locally by creating and executing the necessary unit tests on the corresponding client systems 220. Local test framework 228 may provide the necessary infrastructure to generate local builds of the software project that are sufficient for running the unite tests.

Figure 3:
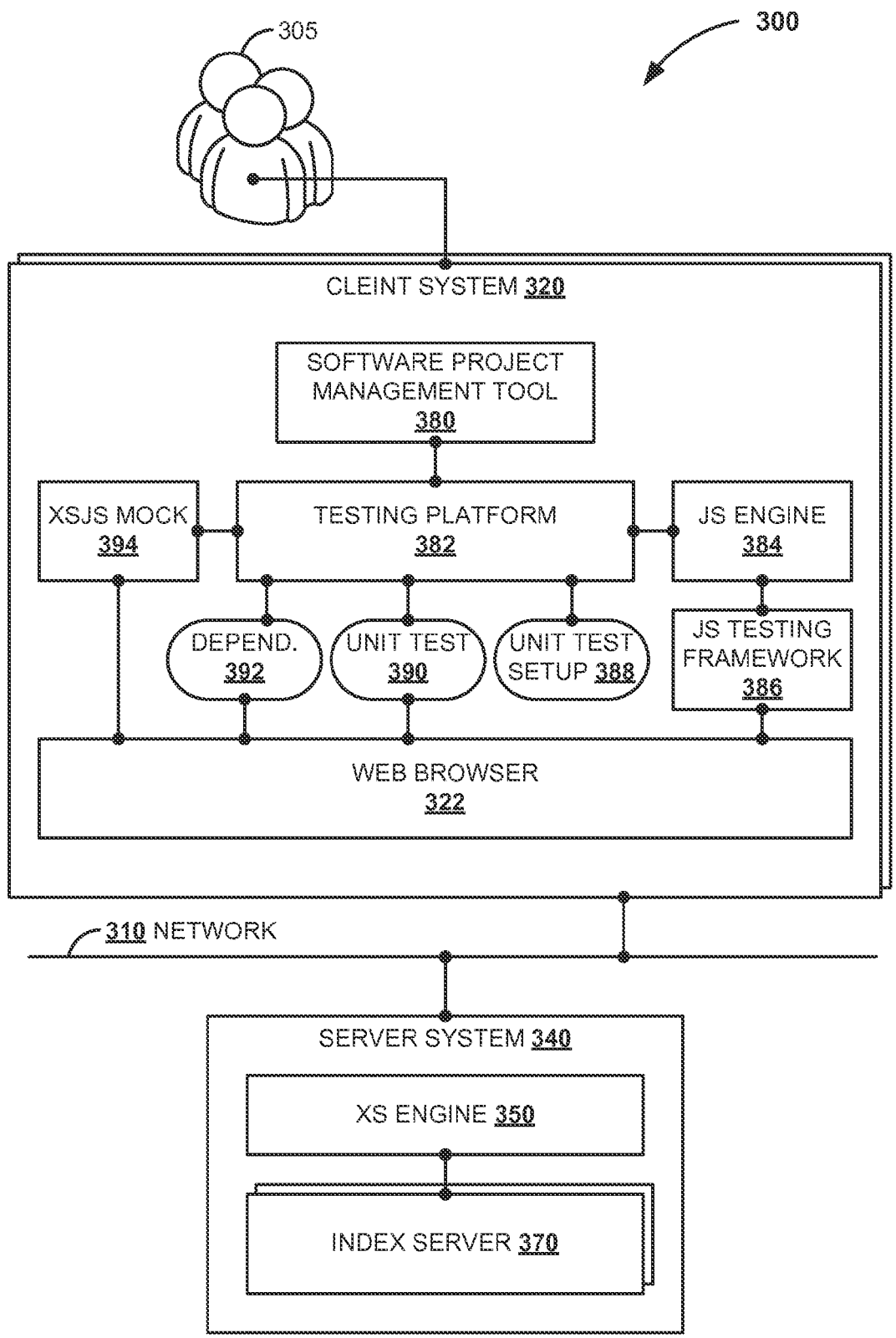
FIG. 3 is a block diagram illustrating a local framework for test-driven development of distributed software projects, according to one embodiment.

FIG. 3 shows exemplary computing environment 300 where a client system or systems 320 implement infrastructure enabling test-driven development of distributed software projects for developers 305, according to one embodiment. As illustrated, the elements of such a local TDD infrastructure may include different modules integrated to provide the necessary framework for JavaScript test-driven development. A person with ordinary skill in the art would recognize that other embodiments may provide similar solutions for TDD in other programming technologies.

Software project management tool 380 is shown as one of the modules of the local TDD infrastructure. An example for such tool is Maven®, a build automation tool used primarily for projects based on Java® technology to manage project builds, reporting and documentation. According to a general definition, build automation could be understood as scripting or automating different tasks that software developers usually perform, such as, compiling computer source code into binary code, packaging binary code, running tests, deployment to production systems, creating documentation and/or release notes, etc.

After project building, testing platform 382 module may be utilized for running different tests, including unit tests in the context of the TDD approach. One example for testing platform is JUnit®, a unit testing framework for the Java programming language. Historically, JUnit testing framework was one of the testing frameworks utilized in the development of test-driven development approach. Currently, JUnit is one of a family of unit testing frameworks which is collectively known as xUnit® that originated with SUnit®. However, such testing frameworks may not be sufficient to enable a local implementation of the test-driven development approach. For example, JUnit may be used directly for testing Java code, but for testing JavaScript code, an additional JavaScript (JS) engine 384 may be necessary. One example for JavaScript execution engine is Rhino®, a tool developed as an open source project managed by Mozilla® Foundation.

JavaScript (JS) testing framework 386 works in communication with the JS engine to provide results from the executions performed by the JavaScript engine 384. Thus, the results of the unit tests run at the testing platform 382 over the project build generated with the help of the software project management tool 380 could be properly reported and interpreted. For example, JS testing framework 386 may be QUnit® framework, which is a JavaScript unit testing framework that helps testing and debugging code. QUnit is general enough to test any regular JavaScript code, and it is able to test server-side JavaScript, via JavaScript engine like Rhino, e.g., in communication with JS engine 384. QUnit may facilitate the local testing of JavaScript code in communication with Web browser 322 as well, as the Web browsers usually have built-in JavaScript engine functionality. In one embodiment, the test results could be provided in the form of Surefire reports.

In the context of the SAP HANA XS example for server side provided services, the local testing for the purposes of the test-driven development of shared software products involves writing of XSJS unit tests, such as unit test 390, and running them locally, e.g., in isolation. The unit test 390 may be HTML based, according to one embodiment. The testing infrastructure implemented as shown enables local testing of various XSJS code, based on the prepared unit tests. The local testing is necessary to allow writing JavaScript code following the test-driven development approach without involving cumbersome deploy procedures and competing for server resources after every code fragment developed by one of the number of developers working on the shared project.

It may be preferable to perform the local testing in continuous integration environment, e.g., built with the help of the software project management tool 380. The testing platform 382 may call the unit test or tests 390, to be executed at the JS engine 384. Thus, even if the testing platform 382 is based on different technology (JUnit is based on Java technology), JavaScript programming code could be tested. Unit test setup 388 may include additional instructions, e.g., a script, for the JS testing framework 386 regarding the reaction on a failed unit test. Such a reaction may include raising a flag, generating a special type of report, etc. A particular unit test flagged as failed could be additionally run and debugged at Web browser 322.

The local testing is challenging as often the execution of a developed source code or unit test may depend on one or more other program units. For example, a locally developed XSJS code may refer to a database, a library or to another script and react based on the result of such reference. The dependencies may be specified in the XSJS code or in the unit tests as metadata, e.g., described in metadata HTML (under specific tags). The metadata may provide a path to the necessary resources on which the execution of the scripts or unit tests depends. Dependency 392 illustrates such resource that should be available to the testing platform 382, and respectively to the JS engine 384 for enabling the local testing.

However, not necessary resources referred by the tested XSJS code and/or unit tests are locally available for enabling isolated test-driven development. Therefore, XSJS mock module 394 may be used to substitute the unavailable resources on which the execution of the tested programs and/or unit tests depends. The XSJS mock module 394 simulates server environment. In one embodiment, the XSJS mock module 394 could be implemented as an application programming interface providing simulated results when referred during test execution.

As a result of the local or isolated test-driven development approach, the incremental local developments could be integrated and tested together at server system 340 (e.g., via network 310) on larger intervals. For example, in SAP HANA application server environment, the generated code and unit tests could be provided at the XS engine 350 to be executed with reference to index server 370 on an integrated software project build. However, based on the testing platform implemented at the client system 320, XSJS programs could be tested locally in simulated server environment as part of project builds. As described, Rhino may provide execution environment for JUnit to run the unit test scripts referring to the XSJS code. The QUnit framework may provide the feedback for the status of the test executions. In addition, failed unit test scripts (HTML) can be debugged in Web browser 322.

Figure 4:
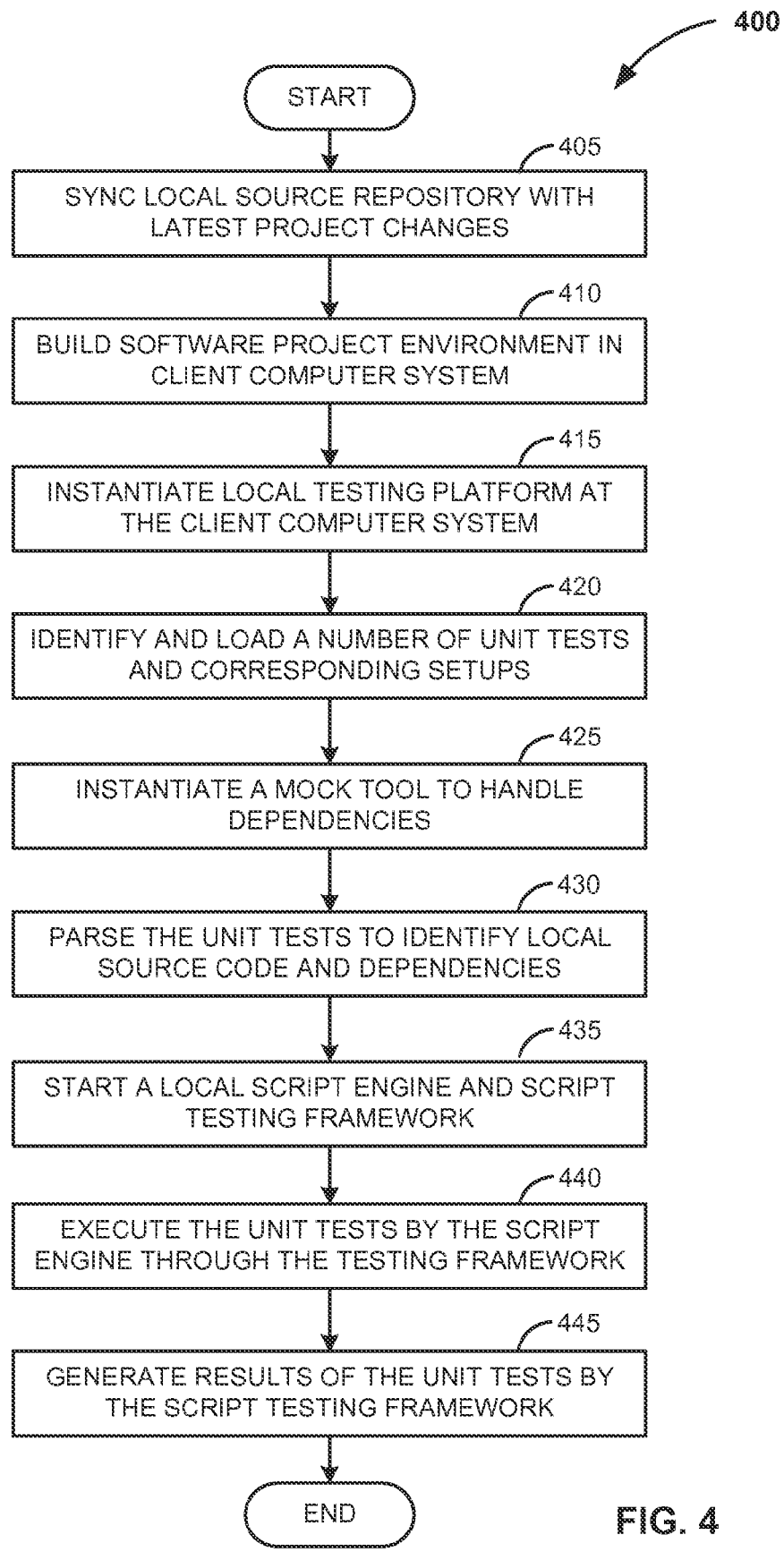
FIG. 4 is a flow diagram illustrating a process of local test-driven development, according to one embodiment.

FIG. 4 shows process 400 to locally test software code of distributed software development project, according to one embodiment. Process 400 as described could be executed in a computer system, similar to the client computer system 320 illustrated in FIG. 3. As a preliminary step, at 405, a source code repository local to the computer system executing the process 400 is synced with latest project changes. In one embodiment, a number of developers may work on the distributed development project in different computer environments. The developers may submit the program code they create to a centralized project repository (e.g., integration server or application server). Respectively, the local repositories of the client computer systems where the developers work could be synced with the centralized repository, e.g., for the purposes of implementation of isolated test-driven development approach.

At 410, software project environment is built in the computer system. In one embodiment, the software project environment is built by software project management tool such as Maven. The software project build could be based on the synced local repository. After generating the software project build, local testing platform may be instantiated at the client computer system (415). The testing platform, e.g., JUnit, may identify and load for execution a number of unit tests and corresponding setups provided by the developer at the local computer system (420). The unit tests could be generated as part of the distributed software project development in accordance with the test-driven development approach. The identified unit tests may be parsed at 430 to identify local source code to be tested and dependencies.

In one embodiment, the testing platform (e.g., testing platform 382 in FIG. 3) scans the project build and collects unit test files created in the project in accordance with the test-driven development approach. The unit test files are created to test corresponding program code, e.g., generated as XSJS files. The unit test files could be HTML based files. The testing platform may extract dependencies from the collected HTML based unit test files, e.g., from the identified QUnit files. For example, the dependencies may be other XSJS files, including XSJS libraries. The dependencies may be described in metadata HTML (e.g., filenames) The metadata (e.g., as a row/instruction in the HTML file) may define a location or storage path to the necessary resource to be used by the testing platform (JUnit) for testing the software project. Some of the dependencies may be described with script tags (HTML tag) in QUnit tests by defining the path to a dependency file. In one embodiment, a dependency file could be uploaded at the testing platform based on the defined path, if available.

Typically, not all dependencies could be resolved by uploading them (e.g., as XSJS files) the testing platform to be available during the test processing. Therefore, at 425, a mock tool is instantiated to handle the dependencies that remain unresolved. The mock tool may simulate server environment, including dependencies, system services, database access etc. In one embodiment, the mock tool may be created by recording some calls to XSJS API, so they could be asserted during the test (e.g. if database connection is required). For example, when SQL (structured query language) query is executed, the mock tool may handle the request instead of connecting to the real database, and return data sets as expected by the test. Functions of files to be imported as dependencies could be replaced with empty ones. This may suppress XSJS script execution during its load. Empty functions could be replaced with productive ones when the mock tool is instantiated, e.g., called by QUnit setup function.

Process 400 continues at 435, where a local script engine (e.g. Rhino JS script engine) and script testing framework (e.g., QUnit) are started. The identified unit tests are executed by the script engine at 440 through the script testing framework. The results of the unit tests are generated by the script testing framework at 445.

In one embodiment, when a unit test scripts (e.g., QUnit test HTML format) is uploaded by the testing platform, it is parsed to get metadata, and from there, to get predefined dependencies. The dependencies may refer to files that may be also uploaded by the testing platform as scripts (e.g., XSJS libraries). At least one additional setup script for the unit test may be referred by the testing platform to define behavior, e.g., if the test fails. Also, a mock tool (e.g., XSJS file, API) could be uploaded, to substitute one or more dependency of locally developed code on libraries that are on a server and not available locally.

Generally, after creating the unit tests and the software code to be tested, according to the test-driven development, a developer may instantiate the local testing of the shared software project. For example, a developer could implement Maven, JUnit, Rhino, QUnit, prepare QUnit HTML based test scripts and XSJS incremental code units to be tested. The developer may run Maven to build the software project based on the locally available project files, e.g., JARs. The testing platform identifies and executes the unit tests at the script engine, and depending on the result, the script testing framework reports successful testing or failure, e.g., of particular unit tests.

For example, when testing of XSJS programs with QUnit test scripts in browser environment, the mock tool simulates server environment. The different XSJS files may provide different service to clients. Rhino script engine provides local execution environment for the scripts (XSJS and unit test scripts) to the JUnit Java testing platform. JUnit and possibly the mock tool may parse the XSJS files, load or substitute the identified dependencies and/or references to generate one big script file. The file could then be passed to Rhino for execution. In local test execution, how the test results are reported, uploaded or otherwise provided, may be determined by the QUnit script testing framework. For example, QUnit framework may be called to register results based on expected answers.

The developer may write the unit test (QUnit HTML file) together with the program code to be tested and set up expectations for the result or behavior of the program code. In one embodiment, the XSJS program code could be provided to the QUnit HTML as a dependency. Generally, the references during the test may be described as dependencies in the QUnit HTML files (unit tests). Thus, they could be uploaded locally, or mocked, to perform the test.

Figure 5:
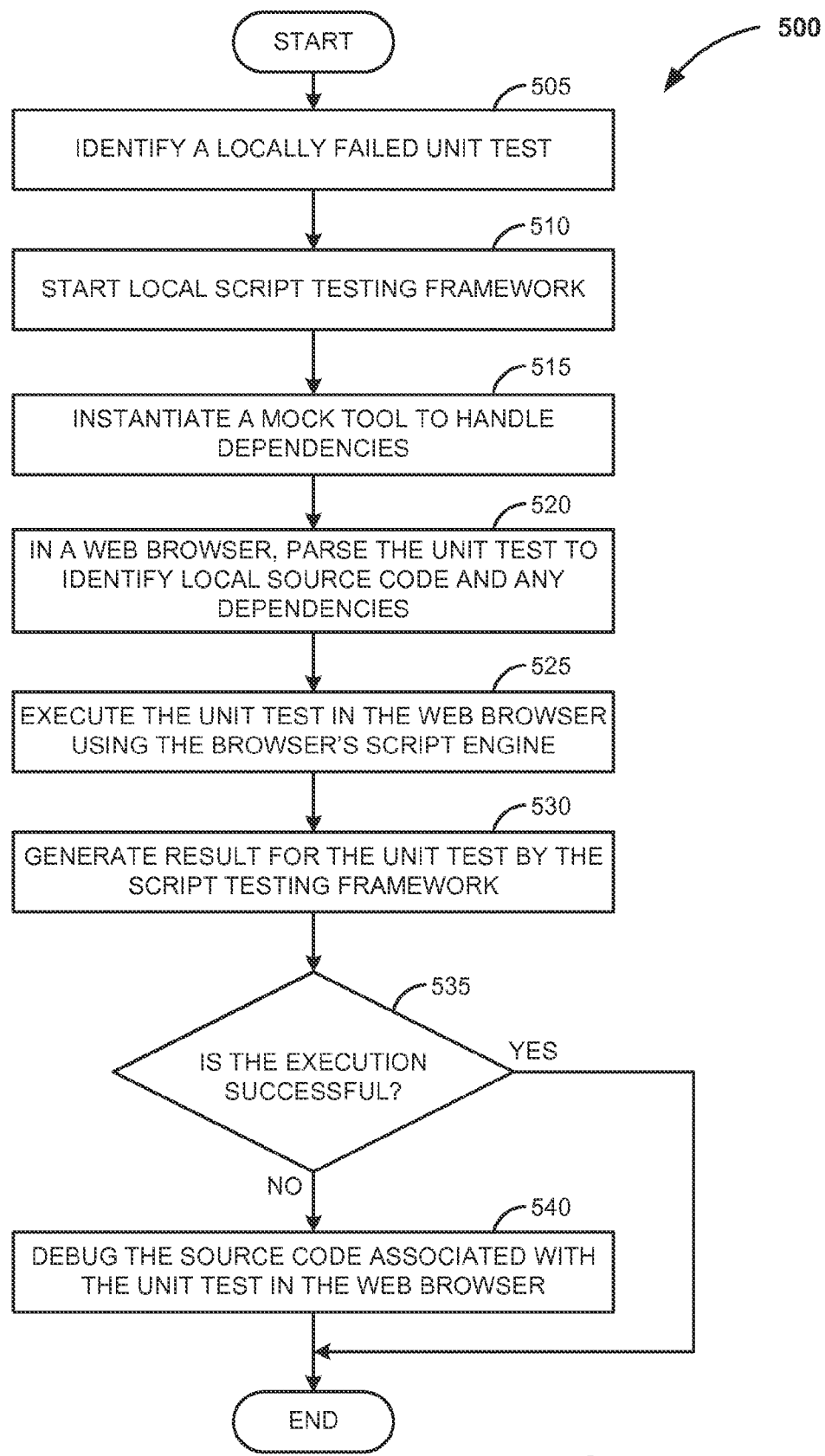
FIG. 5 is a flow diagram illustrating a process of local test-driven development, according to one embodiment.

FIG. 5 shows process 500 to locally test software units in accordance with test-driven development, according to one embodiment. Process 500 depicts testing of software units (e.g., XSJS files) by executing a corresponding unit test (e.g., QUnit HTML file) in a Web browser. Most of the currently available Web browsers include script execution engines (e.g., JS engine). Thus, Web browsers could be utilized for testing purposes in a similar way as the above described testing infrastructure. However, the processing of unit tests in a Web browser may not be used for local testing of a software project build, e.g., in simulated server side environment enabled by the testing platform. The testing of unit tests in a Web browser may be used in addition to the testing done through a testing platform when a prepared unit tests fail. Additionally, Web browsers usually have embedded developer tools that allow for analyzing the error or errors causing the failure of the unit tests, e.g., by debugging, showing problematic source code, etc.

In one embodiment, one or more unit tests, e.g., that have failed during local software project testing are identified at 505. The local script testing framework should be available during the testing as it provides comparison between the desired and actual behavior of the tested programs. Therefore, at 510 the script testing framework (e.g., QUnit) is started or instantiated at the client computer system, when not miming. Similarly, at 515, the mock tool may be instantiated as well, e.g., to simulate the dependencies included in the failed unit tests. The exact source code to be tested, and the associated dependencies as described in a unit test are identified at 520 when the unit test is parsed in the Web browser before execution. The identification of the dependencies and may precede the instantiation of the mock tool. Once the code to be tested is identified and available, together with the handlers of the identified dependencies, the unit test is executed in the Web browser, e.g., using the script engine embedded in the Web browser (525).

The result of the execution may be generated by the script testing framework (e.g., QUnit), at 530. In one embodiment, the script testing framework may compare an outcome from the execution of the source code with an expected outcome. For example, the expected outcome may be specified in the unit test itself. When the result of running the code associated with the unit test corresponds to the expected or desired outcome, a successful execution may be reported, and vice versa. At 535, it is verified whether the execution of the unit test is successful. In case of discrepancy between the achieved behavior or result of the tested source code and the expected outcome, e.g., when the execution is not successful, the source code associated with the unit test could be debugged in the Web browser as pointed out at 540.

Following the process 500, the unit tests (QUnit) could be run and analyzed one at a time. In contrast, process 400 illustrated in FIG. 4 may be used to test collectively the locally developed software in the context of the shared software project (a collection of related XSJS files). While described in reference to SAP HANA technology, similar local testing infrastructure is applicable in other environments that are not SAP HANA XS based. For example, the mock tool may simulate server environments, including dependencies and system services, based on other technologies.

In a particular implementation, JUnit framework loads dynamically created JUnit tests suite, e.g., presented by class "QUnitTest." Out class "QUnitTest" may load different HTML files that present XSJS unit tests (QUnit framework is used in HTML). HTML files may include corresponding markers, e.g., "<!--@RHINO—TEST_SUITE-->." The HTML files may be loaded from a Maven or java project. The "QUnitTest" class may expect two types of markers in the loaded XSJS unit test (QUnit HTML file):
"<!--@RHINO_LOAD_JS="<path to additional xsjslib file to load>"-->"—this marker loads JavaScript resources (program code) XSJS and XSJS library files; and
"<!--@RHINO_TEST_SUITE-->"—this marker loads test script for execution in the testing platform.

Having parsed XSJS unit test (QUnit HTML file), "QUnitTest" class may create "JsTestSuitesRunner" instance to load the resources from "@RHINO_LOAD_JS" into Rhino. The "JsTestSuitesRunner" may also load "@RHINO_TEST_SUITE" into Rhino, and runs the XSJS unit test.

Since the test-driven development requires isolated testing (e.g. no server), SAP HANA XSJS API mock is created (e.g., "xsjs_mock.js," according to one embodiment). The purpose of the mock API, as it was explained, is to record some calls to XSJS API, so they could be addressed during the test (e.g. "is database connection closed"). Depending on particular SQL queries, mock API may return data sets as expected by the tests. Further, the mock API may control XSJS API "$.import" statements, to replace functions of imported files with empty ones. This may be required to suppress XSJS script execution during load. Empty import functions may be replaced with productive ones when "initXsjsMock( );" call is done in QUnit setup function.

Further, XSJS unit test may be written into an HTML file using specific tags (e.g., "@RHINO_LOAD_JS" and "@RHINO_TEST_SUITE"), according to one embodiment. Table 1 shows a sample of such a unit test file:

TABLE 1

XSJS unit test

```
<!-- TEMPLATE XSJS TEST SUITE HTML - FILE NAME MUST END
WITH Test.html (e.g. MyTest.html)-->
<html>
<head>
<link rel="stylesheet"
    href="../../../../../../../../../com.sap.opi.pv.test.utils/src/main/java/
sap/opi/pv/test/utils/js/qunit.css">
<script
    src="../../../../../../../../../com.sap.opi.pv.test.utils/src/main/java/sap/
opi/pv/test/utils/js/qunit.js"></script>
<!--
@RHINO_LOAD_JS="../com.sap.opi.pv.test.utils/src/main/java/sap/opi/
pv/test/utils/js/xsjs_mock.js" -->
<script
    src="../../../../../../../../../com.sap.opi.pv.test.utils/src/main/java/
sap/opi/pv/test/utils/js/xsjs_mock.js"></script>
<!-- YOUR XSJS SCRIPTS SHOULD BE IMPORTED BELOW -->
<!-- Do notice that each HTML script tag has respective rhino load js
marker. -->
<!-- Rhino load JS path is used by maven. This path is based on project's
base directory -->
<!-- Html script tag path is used by browser. This path is based on this
HTML file directory -->
<!-- If the XSJS which you test do use $.import you have to explicitly
load (include html script tag, and respective rhino load marker) -->
<!-- these imports below, before the XSJS which actualy imports them. -->
<!-- Import of commonLib.xsjslib below is a sample one. It is supposed to
be your XSJS under test -->
<!-- @RHINO_LOAD_JS="src/main/uilib/sap/opi/pv/workspace/xsjslibs/
commonLib.xsjslib" -->
<script
    src="../../../../../../../../main /uilib/sap/opi/pv/workspace/xsjslibs/
commonLib.xsjslib"></script>
<!-- @RHINO_TEST_SUITE -->
<script type="text/javascript">
    module("My XSJS Test Suite", {
        setup : function( ) {
            initXsjsMock( ) ;
            // YOUR BEFORE TEST SETUP GOES HERE
        },
        teardown : function( ) {
        }
    });
    test("My First Qunit XSJS test", function( ) {
        // YOUR TEST CODE GOES HERE
    });
    test("My Second Qunit XSJS test", function( ) {
        // YOUR TEST CODE GOES HERE
    });
    //...
</script>
</head>
```

TABLE 1-continued

XSJS unit test

```
<body>
    <div id="qunit"></div>
    <div id="qunit-fixture"></div>
    <!-- This is the unique required constraint to make QMP work as
    expected.
        QUnit will report part of the tests result in this special tag.-->
    <div id="qunit--tests" class="result"></div>
</body>
</html>
```

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
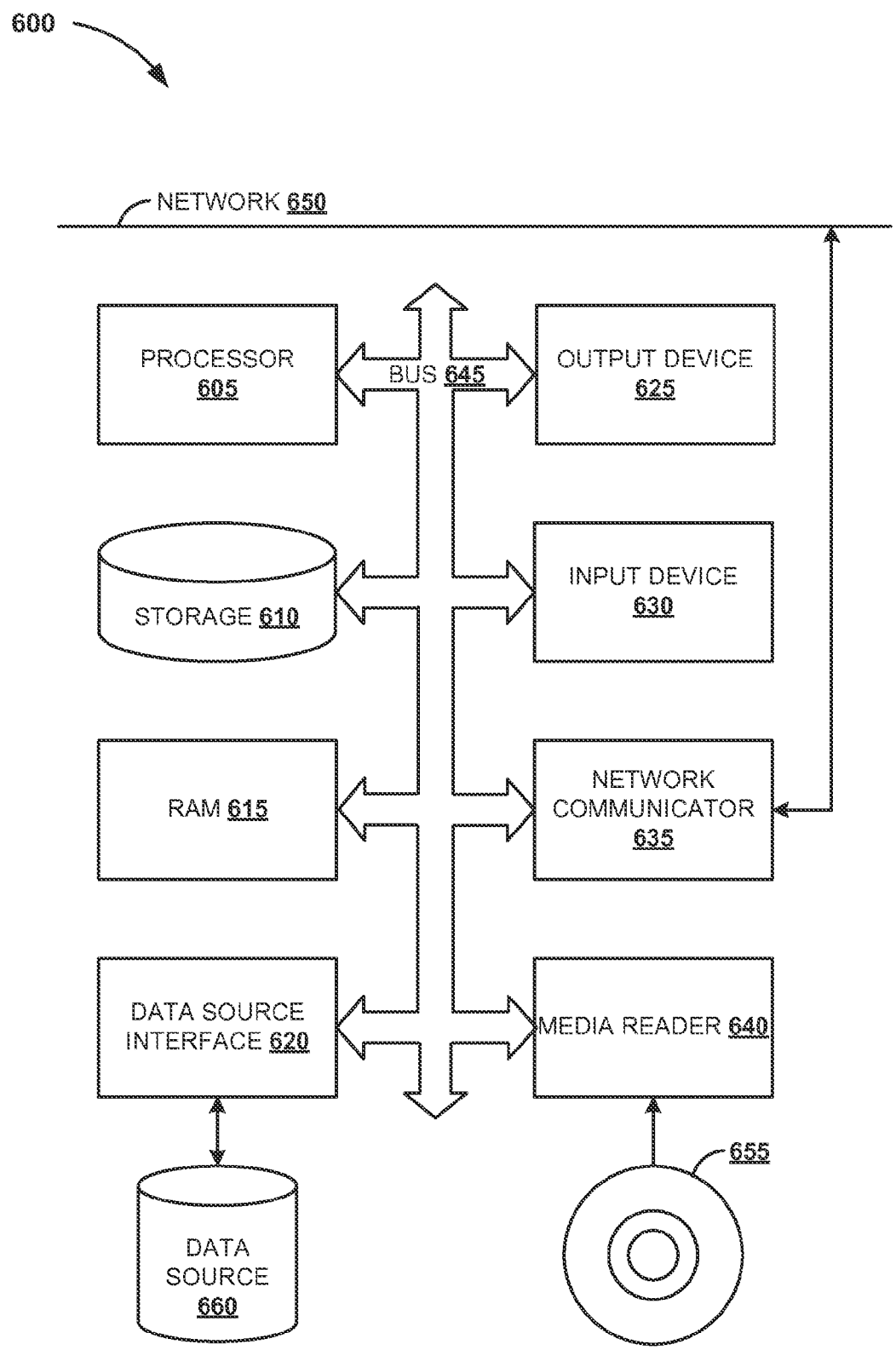
FIG. 6 is a block diagram of an exemplary computer system for implementing local test-driven development framework, according to one embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed via network 650. In some embodiments the data source 660 may be accessed by an abstraction layer, such as, a semantic layer.

A data Source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A computer implemented method to perform isolated test driven development, the method comprising:
    creating a local build of a distributed development project at a user computer system based on locally stored resources;
    instantiating a first testing framework to test project source code of the local build of the distributed development project at the user computer system;
    creating a mocking framework to locally substitute at least one external resource required for testing of the project source code at the user computer system;
    extending the first testing framework with a script engine to execute script code at the user computer system to test the project source code;
    integrating, at the user computer system, the script engine with a second testing framework to interpret a result of execution of the script code;
    loading a plurality of script code unit tests associated with the local build of the distributed development project at the user computer system;
    based on the plurality of script code unit tests, identifying a plurality of local project source code units by reading metadata from the plurality of script code unit tests specifying a plurality of dependencies of the plurality of local project source code units, wherein the plurality of dependencies specify at least one external resource of the distributed development project, required for running at least one of the plurality of script code unit tests, the at least one external resource is stored outside the user computer system;
    running the plurality of script code unit tests over the plurality of local project source code units at the extended first testing framework; and
    in the second testing framework, generating a report based on the running of the plurality of script code unit tests.

2. The method of claim 1, wherein loading the plurality of script code unit tests comprises:
    loading a plurality of script code unit test setups corresponding to the plurality of script code unit tests, wherein a script code unit test setup of the plurality of script code unit test setups defines a reaction on an unsuccessful run of a corresponding script code unit test of the plurality of script code unit tests.

3. The method of claim 1, wherein identifying the plurality of local project source code units comprises:
    reading metadata from the plurality of script code unit tests specifying the plurality of local project source code units.

4. The method of claim 1, wherein running the plurality of script code unit tests comprises:
    requesting execution of the plurality of local project source code units according to at least one test scenario provided by the plurality of script code unit tests.

5. The method of claim 1 further comprising:
    comparing the result of the local run of the plurality of script code unit tests with a predefined expected result at the second testing framework;
    reporting successful test or at least one failed script code unit test of the plurality of script code unit tests; and
    debugging locally in a web browser the at least one failed script code unit test.

6. A non-transitory computer readable medium storing instructions, which when executed by at least one processor cause a computer system to perform operations comprising:
    creating a local build of a distributed development project at the computer system based on locally stored resources;
    instantiating a first testing framework to test project source code of the local build of the distributed development project at the computer system;
    instantiating a mocking framework to locally substitute at least one external resource required for testing of the project source code at the computer system;
    extending the first testing framework with a script engine to execute script code at the computer system to test the project source code;
    integrating, at the computer system, the script engine with a second testing framework to interpret a result of execution of the script code;
    loading a plurality of script code unit tests associated with the local build of the distributed development project;
    based on the plurality of script code unit tests, identifying a plurality of local project source code units by reading metadata from the plurality of script code unit tests specifying a plurality of dependencies of the plurality of local project source code units, wherein the plurality of dependencies specify at least one external resource of the distributed development project to be handled by the mocking framework during the execution of the plurality of script code unit tests, the at least one external resource is stored outside the computer system;
    executing the plurality of script code unit tests over the plurality of local project source code units by the script engine; and
    in the second testing framework, generating a report based on a result of the execution of the plurality of script code unit tests.

7. The computer readable medium of claim 6, wherein identifying the plurality of local project source code units comprises:
    reading metadata from the plurality of script code unit tests specifying the plurality of local project source code units.

8. The computer readable medium of claim 6, wherein generating the report based on the result comprises:
    comparing the result of the execution of the plurality of script code unit tests with a predefined expected result at the second testing framework; and
    reporting at least one failed script code unit test of the plurality of script code unit tests.

9. The computer readable medium of claim 8 storing instructions, which when executed by the at least one processor cause the computer to perform operations further comprising:

executing the at least one failed script code unit test at a web browser.

10. A computer system to perform isolated testing of distributed development projects, the system comprising:
a memory that stores instructions; and
a processor that executes the instructions stored in the memory to create a local build of a distributed development project at the computer system based on locally available resources;
a first testing framework that tests project source code of the local build of the distributed development project at the computer system, wherein the first testing framework loads a plurality of script code unit tests associated with the local build of the development project, wherein the plurality of script code unit tests is loaded by reading metadata from the plurality of script code unit tests specifying a plurality of dependencies, and wherein the plurality of dependencies specify a plurality of external resources required for executing the plurality of script code unit tests, the plurality of external resources are stored outside the computer system;
a mocking framework that substitutes at least one external resource of the plurality of external resources required for testing of the project source code locally at the computer system;
a script engine that extends the first testing framework to execute the script code unit tests in the computer system to test the project source code; and
a second testing framework integrated with the script engine at the computer system that interprets a result of execution of at least one of the plurality of script code unit tests.

11. The system of claim 1, wherein loading the plurality of script code unit tests comprises:
loading a plurality of script code unit test setups corresponding to the plurality of script code unit tests, wherein a script code unit test setup of the plurality of script code unit test setups defines a reaction on an execution of a script code unit test of the plurality of script code unit tests.

12. The system of claim 1, wherein loading the plurality of script code unit tests comprises:
reading metadata from the plurality of script code unit tests specifying the plurality of local project source code units.

13. The system of claim 1, wherein executing the plurality of script code unit tests comprises:
requesting execution of a plurality of local project source code units according to at least one test scenario provided by the plurality of script code unit tests.

14. The system of claim 1, wherein generating the report based on the result comprises:
comparing the result of the execution of the plurality of script code unit tests with an expected result; and
upon the comparison, reporting successful test or at least one failed script code unit test of the plurality of script code unit tests.

15. The system of claim 14 further comprising:
a web browser that runs the at least one failed script code unit test of the plurality of script code unit tests in debug mode.

* * * * *